US012790935B2

(12) United States Patent
Kamada et al.

(10) Patent No.: US 12,790,935 B2
(45) Date of Patent: Nov. 10, 2026

(54) ORIENTING PROCESSING DEVICE, ORIENTING ASSISTANCE METHOD, AND PROGRAM

(71) Applicant: TOHOKU UNIVERSITY, Sendai (JP)

(72) Inventors: Yusuke Kamada, Sendai (JP); Yusuke Mukuhira, Sendai (JP); Takatoshi Ito, Sendai (JP); Hitomi Anzai, Sendai (JP)

(73) Assignee: Tohoku University, Sendai (JP)

( * ) Notice: Subject to any disclaimer, the term of this patent is extended or adjusted under 35 U.S.C. 154(b) by 283 days.

(21) Appl. No.: 18/689,480

(22) PCT Filed: Sep. 8, 2021

(86) PCT No.: PCT/JP2021/032993
§ 371 (c)(1),
(2) Date: Mar. 6, 2024

(87) PCT Pub. No.: WO2023/037442
PCT Pub. Date: Mar. 16, 2023

(65) Prior Publication Data
US 2024/0352818 A1 Oct. 24, 2024

(51) Int. Cl.
*E21B 47/002* (2012.01)
*G06T 7/00* (2017.01)

(52) U.S. Cl.
CPC ........ *E21B 47/0025* (2020.05); *G06T 7/0004* (2013.01); *G06T 2207/30181* (2013.01)

(58) Field of Classification Search
None
See application file for complete search history.

(56) References Cited

U.S. PATENT DOCUMENTS 8,106,968 B1 * 1/2012 Rudin .................... G06V 10/94 348/241
9,906,654 B1 * 2/2018 Taylor ................ H04N 1/00005
(Continued)

FOREIGN PATENT DOCUMENTS

JP H 0381492 A 4/1991
JP H 0453239 A 2/1992
JP 2881758 B 3/1996

OTHER PUBLICATIONS

Anonymous, "Canny edge detector", Wikipedia, URL: https://en.wikipedia.org/w/index.php?title=Canny_edge_detector&oldid=999701882; Jan. 11, 2021, 10 pages.
(Continued)

*Primary Examiner* — Helen Zong
(74) *Attorney, Agent, or Firm* — Dority & Manning, P.A.

(57) ABSTRACT

An orienting processing device includes: an image data acquisition unit configured to acquire rock image data indicating a rock image, borehole image data indicating a borehole image, and orientation information indicating an orientation in which the surface of the borehole is imaged; a feature data extraction unit configured to extract feature data related to a pattern of the surface of the rock from the rock image, and extract feature data related to a pattern of the surface of the borehole image; and an orienting unit configured to perform an alignment between the pattern of the surface of the rock and the pattern of the surface of the borehole based on the feature data, and identify an orientation in which the surface of the rock is imaged based on a result of the alignment and the orientation information.

10 Claims, 13 Drawing Sheets

(56) References Cited

U.S. PATENT DOCUMENTS

| | | | | |
|---|---|---|---|---|
| 2009/0080705 | A1 | 3/2009 | Orpen | |
| 2017/0252213 | A1* | 9/2017 | Furuuchi | A61F 9/00821 |
| 2021/0003731 | A1 | 1/2021 | Zhu et al. | |
| 2022/0012463 | A1* | 1/2022 | Hwang | G06F 16/532 |
| 2023/0295692 | A1* | 9/2023 | Berti | C12Q 1/6855<br>435/6.11 |

OTHER PUBLICATIONS

Extended European Search Report for corresponding Application No. 21956739.3, mailed Jun. 10, 2025, 8 pages.

Ito et al., "Medical image registration using phase-only correlation for distorted dental radiographs", 19th International Conference On Pattern Recognition, Tampa, Florida, Dec. 2008, 4 pages.

Paulsen et al., "A simple method for orienting drill core by correlating features in whole-core scans and oriented borehole-wall imagery", Journal of Structural Geology, vol. 24, 2002, pp. 1233-1238.

Shigematsu et al., "Orienting drill core using borehole-wall image correlation analysis", Journal of Structural Geology, vol. 67, Feb. 14, 2014, pp. 293-299.

International Search Report (with English translation) for Application No. PCT/JP2021/032993, dated Nov. 22, 2021, 4 pages.

Tatsuhiro Sugimoto et al., A Method for Core Reorientation Based on Rock Remanent Magnetization: Application to Hemipelagic Sedimentary Soft Rock, Journal of the Society of Materials Science, Japan, vol. 69, No. 3, pp. 256-262, Mar. 2020.

* cited by examiner

FIG. 9

| | CONTRAST ADJUSTMENT | | CANNY FILTER | SOBEL FILTER |
|---|---|---|---|---|
| | EDGE AMPLITUDE | SMOOTHING AMOUNT | EDGE AMPLITUDE | EDGE AMPLITUDE |
| HOLE WALL | 0.3 | −0.02 | 0.2 | 0.2 |
| CORE | 0.3 | −0.02 | 0.2 | 0.2 |

ORIENTING PROCESSING DEVICE, ORIENTING ASSISTANCE METHOD, AND PROGRAM

CROSS-REFERENCE TO RELATED APPLICATIONS

This application is the U.S. National Stage entry of International Application No. PCT/JP2021/032993, filed on Sep. 8, 2021, which is incorporated herein by reference in its entirety for all purposes.

TECHNICAL FIELD

The present invention relates to an orienting processing device, an orienting assistance method, and a program.

BACKGROUND ART

Today, wells are being drilled for the purpose of extracting stratum fluids such as oil and gas that exist underground, collecting and storing carbon dioxide, and developing geothermal energy. The current mainstream method for drilling wells is a method called a rotary drilling method. In the rotary drilling method, a drill bit for drilling bedrock is attached to a tip end of a long connected drill pipe, which is lowered into a well. The drill bit is then rotated by rotating an upper end of the drill pipe on ground, and a rock at a well bottom is cut away and drilled.

When drilling is performed by the above method, for example, a cylindrical rock sample is often extracted from the well being drilled. The rock sample is generally called a rock core. FIG. 11 is an example of a photograph of the extracted rock core. By analyzing the rock core, a substance that exists underground can be estimated and physical properties of a stratum can be measured easily and at low cost. For example, a differential stress of a crustal stress can be obtained from a difference between a maximum diameter and a minimum diameter in a circumferential direction of the rock core.

Further, when an orientation of the rock core underground is known, in addition to the differential stress of the crustal stress, a direction of the crustal stress can also be estimated at the same time. In addition, it is expected that, by knowing the orientation of the rock core underground, information on a stratum structure, such as an underground anisotropic permeability and an underground fault orientation, can be estimated.

However, it is not easy to determine the orientation of the rock core underground. The method for extracting the rock core is called coring. FIG. 12 is a schematic diagram showing an example of the coring. In the coring, unlike the drill bit used when drilling, a bit called a core bit in which a hole for extracting a rock core is opened at a center of the drill is used. The rock core separated from the bedrock underground is passed through the core bit into a tube called a core barrel, and taken out above ground.

In the general coring method, the rock core is inevitably rotated within a coring device when the rock core is taken out from the ground. Therefore, when collecting the rock core on the ground, it is difficult to accurately estimate an orientation of the rock core underground (hereinafter referred to as "orienting"). Examples of a general method to perform orienting of a rotating rock core include a method of estimating an orientation by modeling a cross section of a rock core underground and matching the cross section with a cross section of a collected rock core, and a method of estimating an orientation from differences in a gravity direction using a tool equipped with an acceleration sensor. However, in the former method, it is difficult to accurately model a cross section of a rock core deep underground. Further, the latter method cannot be applied to completely vertical wells.

CITATION LIST

Patent Literature

PTL 1: Japanese Unexamined Patent Application Publication No. Hei 4-53239

PTL 2: Japanese Patent No. 2881758

Non Patent Literature

NPL 1: Tatsuhiro Sugimoto et al., "A method for core reorientation based on rock remanent magnetization: Application to hemipelagic sedimentary soft rock", Materials (Journal of the Society of Materials Science, Japan), Vol. 69, No. 3, The Society of Materials Science, Japan, pp. 256-262, March 2020

SUMMARY OF INVENTION

Technical Problem

As an example of a method to orient a rock core without using the tool as described above, there is a method of using a borehole image of a well taken by well logging and a 360-degree development image of an extracted rock core. FIG. 13 is a diagram showing a state of orienting of a rock core by the above method. A procedure of the above method is as follows. First, an operator prints out a borehole image and traces a pattern of the borehole image on paper. Next, the operator wraps the paper after tracing around a surface of a rock core such that a vein pattern drawn on the borehole image matches a vein pattern drawn on the paper. Then, the operator determines an orientation of the rock core based on a location where the pattern of the borehole image traced on the paper matches the pattern of the rock core.

Here, the borehole image of the well includes information on a drilling depth and information indicating the orientation of the rock core underground. Therefore, the operator can identify the orientation of the rock core underground by wrapping the paper after tracing to match the pattern of the surface of the rock core. That is, in the method, orienting of the rock core can be implemented by performing, by the operator visually, an alignment of the pattern of the borehole image with respect to the pattern of the rock core.

However, the method is often affected by a subjectivity of the operator. In the method, when it is necessary to perform orienting for all rock cores extracted from a well at a depth of several hundred meters, a large amount of time is required.

In view of the above circumstances, an object of the invention is to provide a technique that can objectively and automatically determine an orientation of a rock core.

Solution to Problem

An aspect of the invention is an orienting processing device. The orienting processing device includes: an image data acquisition unit configured to acquire rock image data indicating a rock image obtained by imaging a surface of a rock which is drilled, borehole image data indicating a borehole image obtained by imaging a surface of a borehole at a location where the rock was present, and orientation information indicating an orientation in which the surface of the borehole is imaged; a feature data extraction unit configured to extract feature data related to a pattern of the surface of the rock from the rock image, and extract feature data related to a pattern of the surface of the borehole image; and an orienting unit configured to perform an alignment between the pattern of the surface of the rock and the pattern of the surface of the borehole based on the feature data extracted by the feature data extraction unit, and identify an orientation in which the surface of the rock is imaged based on a result of the alignment and the orientation information.

An aspect of the invention is an orienting assistance method. The orienting assistance method includes: an image data acquisition step of, by a computer, acquiring rock image data indicating a rock image obtained by imaging a surface of a rock which is drilled, borehole image data indicating a borehole image obtained by imaging a surface of a borehole at a location where the rock was present, and orientation information indicating an orientation in which the surface of the borehole is imaged; a feature data extraction step of, by a computer, extracting feature data related to a pattern of the surface of the rock from the rock image, and extracting feature data related to a pattern of the surface of the borehole image; and an orienting step of, by a computer, performing an alignment between the pattern of the surface of the rock and the pattern of the surface of the borehole based on the feature data extracted in the feature data extraction step, and identifying an orientation in which the surface of the rock is imaged based on a result the alignment and the orientation information.

An aspect of the invention is a program for causing a computer to execute: an image data acquisition step of acquiring rock image data indicating a rock image obtained by imaging a surface of a rock which is drilled, borehole image data indicating a borehole image obtained by imaging a surface of a borehole at a location where the rock was present, and orientation information indicating an orientation in which the surface of the borehole is imaged; a feature data extraction step of extracting feature data related to a pattern of the surface of the rock from the rock image, and extracting feature data related to a pattern of the surface of the borehole image; and an orienting step of performing an alignment between the pattern of the surface of the rock and the pattern of the surface of the borehole based on the feature data extracted in the feature data extraction step, and identifying an orientation in which the surface of the rock is imaged based on a result of the alignment and the orientation information.

Advantageous Effects of Invention

According to the invention, an orientation of a rock core can be determined objectively and automatically.

BRIEF DESCRIPTION OF DRAWINGS

FIG. 9 is a diagram showing parameters that can be set during the preprocessing and optimized parameter values.

DESCRIPTION OF EMBODIMENTS

Hereinafter, an embodiment of the invention will be described in detail with reference to the drawings. An orienting processing device 1 of the embodiment described below is a device that performs orienting of a rock core using an image analysis technique. The orienting processing device 1 automatically performs an alignment of image patterns by image registration, which is one of the image analysis techniques, using a borehole image of which an orientation is known and a core development image, and performs orienting for a rock core. In this way, the orienting processing device 1 can objectively and automatically determine an orientation of the rock core.

[Configuration of Orienting Processing Device]

Figure 1:
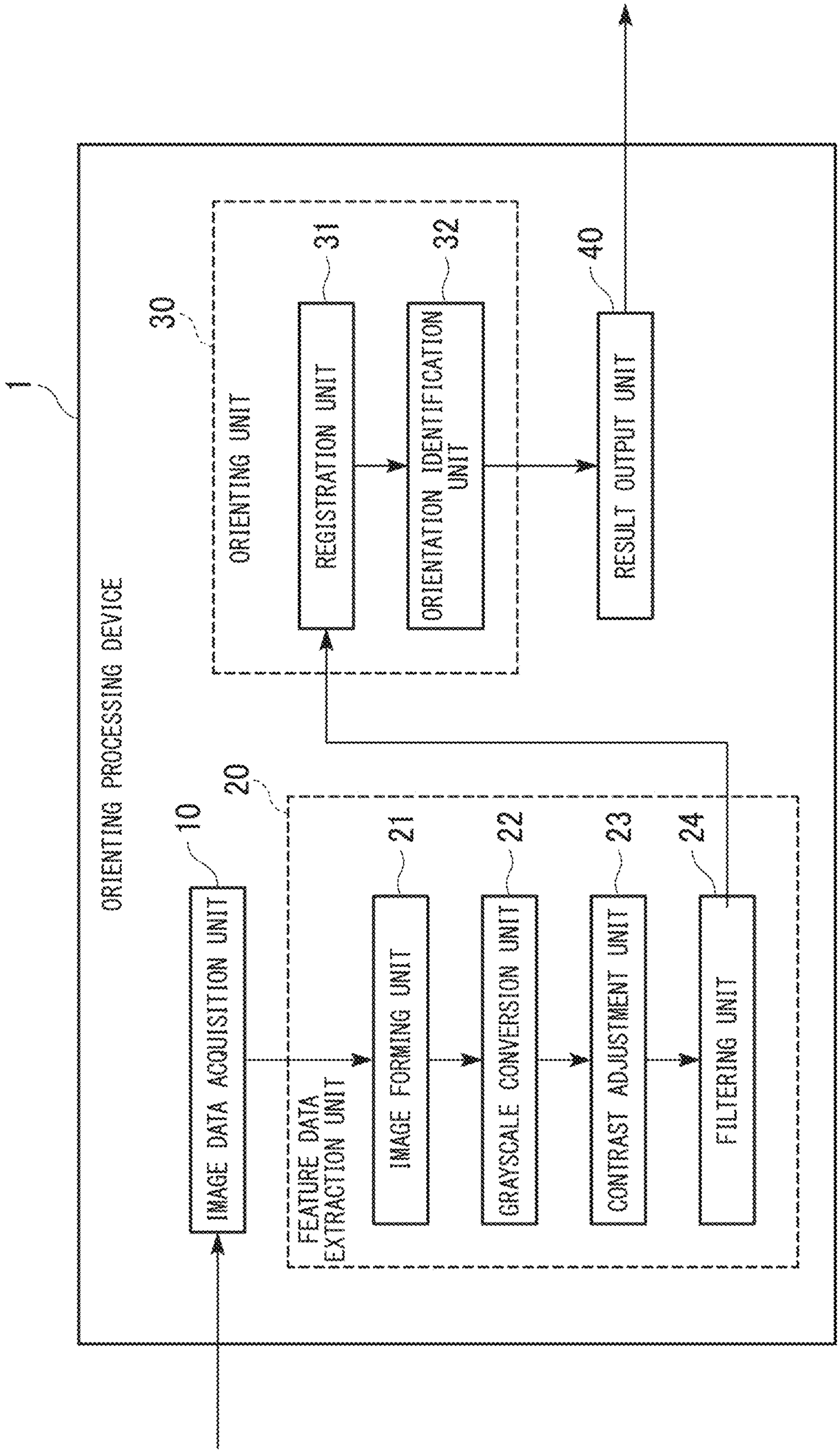
FIG. 1 is a block diagram showing a functional configuration of an orienting processing device 1 according to an embodiment of the invention.

Hereinafter, a configuration of the orienting processing device 1 in the embodiment will be described. FIG. 1 is a block diagram showing a functional configuration of the orienting processing device 1 in the embodiment of the invention. The orienting processing device 1 is an information processing device such as a general-purpose computer. As shown in FIG. 1, the orienting processing device 1 includes an image data acquisition unit 10, a feature data extraction unit 20, an orienting unit 30, and a result output unit 40.

The image data acquisition unit 10 acquires image data of a core development image and image data of a borehole image from, for example, an external information processing device or a storage medium. The core development image is, for example, a development image obtained by imaging a surface (for example, 360 degrees around a side surface) of a rock core drilled in a cylindrical shape. The borehole image is a development image obtained by imaging a surface (for example, 360 degrees) of a borehole at a location where the above drilled rock was in contact with underground.

The image data of the borehole image includes information (orientation information) indicating an orientation in which the surface of the borehole is imaged. Therefore, it is possible to identify in which orientation each location in the borehole image is located on an actual borehole.

The image data acquisition unit 10 may separately acquire the orientation information and the image data of the borehole image not including the orientation information instead of acquiring the image data of the borehole image including the orientation information.

The orientation information is not limited to information explicitly indicating the orientation as long as it is information that enables the orientation in which the surface of the borehole is imaged to be identified, for example, when it is determined in advance that an identified portion of the borehole image is facing a predetermined angle.

The image data acquisition unit 10 outputs the acquired image data of the core development image and image data of the borehole image to the feature data extraction unit 20. Hereinafter, the image data of the core development image may be simply referred to as the "core development image", and the image data of the borehole image may be simply referred to as the "borehole image".

The feature data extraction unit 20 performs processing (hereinafter, also referred to as "preprocessing") of extracting feature data related to a pattern of the surface of the rock core from the core development image and extracting feature data related to a pattern of the surface of the borehole from the borehole image before image registration and orienting by the orienting unit 30 to be described later. Here, the pattern is, for example, a vein pattern.

As shown in FIG. 1, the feature data extraction unit 20 includes an image forming unit 21, a grayscale conversion unit 22, a contrast adjustment unit 23, and a filtering unit 24.

The image forming unit 21 acquires the core development image and the borehole image from the image data acquisition unit 10. The image forming unit 21 forms data of the acquired core development image and borehole image into a format that facilitates image analysis. For example, the image forming unit 21 cuts out an image area in a range corresponding to a location at the same depth from each of the acquired core development image and borehole image, and performs image processing such as enlargement and reduction, and trimming. The image forming unit 21 outputs the formed core development image and borehole image to the grayscale conversion unit 22.

The grayscale conversion unit 22 acquires the core development image and the borehole image from the image forming unit 21. When at least one of the acquired core development image and borehole image is a color image, the grayscale conversion unit 22 converts the color image into a grayscale image. The grayscale conversion unit 22 outputs the core development image and the borehole image, which are grayscale images, to the contrast adjustment unit 23.

The contrast adjustment unit 23 acquires the core development image and the borehole image from the grayscale conversion unit 22. The contrast adjustment unit 23 adjusts a contrast of each of the obtained core development image and borehole image, thereby emphasizing an edge of a pattern in the core development image and an edge of a pattern in the borehole image. The edge is, for example, a portion where a pixel value rapidly changes in an image. The contrast adjustment unit 23 outputs the contrast-adjusted core development image and borehole image to the filtering unit 24.

The filtering unit 24 acquires the core development image and the borehole image from the contrast adjustment unit 23. The filtering unit 24 performs filtering on each of the acquired core development image and borehole image to remove noise or sharpen the pattern, thereby emphasizing the edge of the pattern in the core development image and the edge of the pattern in the borehole image. The filtering unit 24 performs the filtering using, for example, a Canny filter. The filtering unit 24 outputs the filtered core development image and borehole image to the orienting unit 30.

An order of the processing performed by the image forming unit 21, the grayscale conversion unit 22, the contrast adjustment unit 23, and the filtering unit 24 is not limited to the above order, and may be any order.

The orienting unit 30 performs image registration (an alignment) of patterns in both images using the core development image and the borehole image that are preprocessed by the feature data extraction unit 20. The orienting unit 30 performs, based on the core development image and the borehole image that are aligned by the image registration, and the orientation information included in the borehole image data, orienting to identify an orientation in which the core development image is imaged (that is, an orientation of the rock core underground).

As shown in FIG. 1, the orienting unit 30 includes a registration unit 31 and an orientation identification unit 32.

The registration unit 31 acquires the core development image and the borehole image from the filtering unit 24. The registration unit 31 performs the image registration (the alignment) on the pattern in the core development image and the pattern in the borehole image.

The registration unit 31 performs the image registration using, for example, a phase-only correlation method. In this case, the registration unit 31 performs the image registration by approximating the pattern in the core development image and the pattern in the borehole image to a shape of a sine wave. By performing the image registration after approximating the patterns to the shape of a sine wave, the registration unit 31 can perform the alignment of the patterns with higher accuracy.

The registration unit 31 may assume the pattern in the core development image and the pattern in the borehole image as sine waves, detect the sine waves using a method such as Hough transform, and perform image registration of the sine waves.

The registration unit 31 outputs, to the orientation identification unit 32, information indicating an image registration result and orientation information included in the borehole image data. The information indicating the image registration result is, for example, information in which a location in the core development image and a location in the borehole image that are estimated to be the same location, are associated. Alternatively, the information indicating the image registration result is, for example, image data obtained by superimposing (or synthesizing) both images based on a location in the core development image and a location in the borehole image that are estimated to be the same location.

The orientation identification unit 32 acquires the information indicating the image registration result and the orientation information from the registration unit 31. The orientation identification unit 32 performs, based on the core development image and the borehole image that are aligned by the image registration, and a borehole orientation based on the orientation information, orienting to identify an orientation in which the core development image is imaged (that is, an orientation of the rock core underground). The orientation identification unit 32 outputs, to the result output unit 40, information indicating the identified orientation.

The result output unit 40 acquires the information indicating the orientation from the orientation identification unit 32. The result output unit 40 outputs the acquired information indicating the orientation to, for example, an external information processing device. The result output unit 40 may include a display device such as a liquid crystal display (LCD), and output a result by displaying the information indicating the orientation on the display device.

[Operation of Orienting Processing Device]

Figure 2:
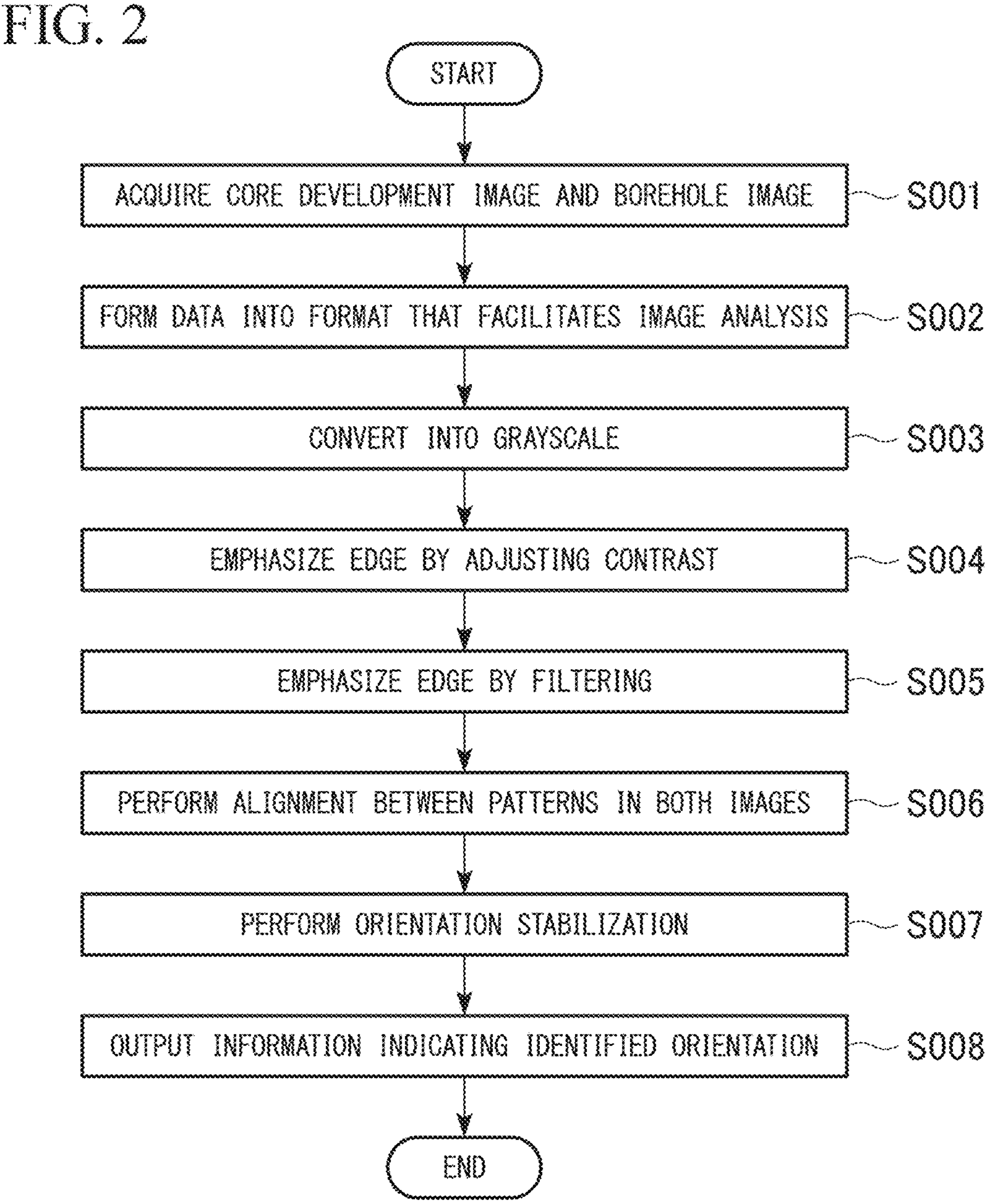
FIG. 2 is a flowchart showing an operation of the orienting processing device 1 according to the embodiment of the invention.

Hereinafter, an example of an operation of the orienting processing device 1 in the embodiment will be described. FIG. 2 is a flowchart showing the operation of the orienting processing device 1 according to the embodiment of the invention.

First, the image data acquisition unit 10 acquires the core development image and the borehole image from, for example, an external information processing device (step S001). The borehole image includes the information (the orientation information) indicating the orientation in which the surface of the borehole is imaged.

Next, the image forming unit 21 forms data of the core development image and the borehole image into a format that facilitates image analysis (step S002).

Next, when at least one of the core development image and the borehole image is a color image, the grayscale conversion unit 22 converts the color image into a grayscale image (step S003).

Next, the contrast adjustment unit 23 adjusts a contrast of each of the obtained core development image and borehole image, thereby emphasizing an edge of a pattern in the core development image and an edge of a pattern in the borehole image (step S004).

Next, the filtering unit 24 performs filtering on each of the core development image and the borehole image to remove noise or sharpening the pattern, thereby emphasizing the edge of the pattern in the core development image and the edge of the pattern in the borehole image (step S005). The filtering unit 24 performs the filtering using, for example, a Canny filter.

Next, the registration unit 31 performs image registration (an alignment) on the pattern in the core development image and the pattern in the borehole image (step S006). The registration unit 31 performs the image registration using, for example, a phase-only correlation method.

Next, the orientation identification unit 32 performs, based on the core development image and the borehole image that are aligned by the image registration and a borehole orientation based on the orientation information included in the borehole image data, orienting to identify an orientation in which the core development image is imaged (that is, an orientation of the rock core underground) (step S007).

The result output unit 40 outputs the information indicating the identified orientation to, for example, an external device (step S008). The operation of the orienting processing device 1 shown in the flowchart in FIG. 2 ends.

Hereinafter, the processing performed by the orienting processing device 1 of the embodiment will be described in more detail.

The orienting processing device 1 of the embodiment sequentially performs extraction and forming of image data, image preprocessing, image registration, and orienting. The orienting processing device 1 uses, for example, a phase-only correlation method as an image registration method. The phase-only correlation method is a technique used for matching images with complicated linear patterns, such as fingerprint matching. The orienting processing device 1 of the embodiment detects a characteristic linear pattern, such as a vein pattern, from the borehole image and the core development image, and performs the image registration using the phase-only correlation method.

In the present embodiment, the orienting processing device 1 is a device that performs orienting of a rock core, and is not limited thereto. The invention can be applied to orienting of an object other than the rock core as long as the object has a characteristic linear pattern.

[Image Preprocessing]

Hereinafter, the image preprocessing performed by the orienting processing device 1 in the embodiment will be described in detail.

The orienting processing device 1 in the embodiment performs the preprocessing on an image for the purpose of accurately detecting necessary information (feature data) from the image before performing the image registration and the orienting. The preprocessing mainly includes processing such as image contrast adjustment and filtering.

First, image contrast adjustment will be described. The orienting processing device 1 can make a difference between a dark portion and a bright portion of the image clearer by performing the contrast adjustment of the image. Specifically, as a method for contrast adjustment of an image, for example, a method of equalizing a histogram of luminance values in an image can be used.

The orienting processing device 1 in the embodiment locally adjusts the contrast of the image. Specifically, the orienting processing device 1 performs local contrast adjustment by performing processing of smoothing details while maintaining strong edge portions drawn in an image as they are.

Figure 3:
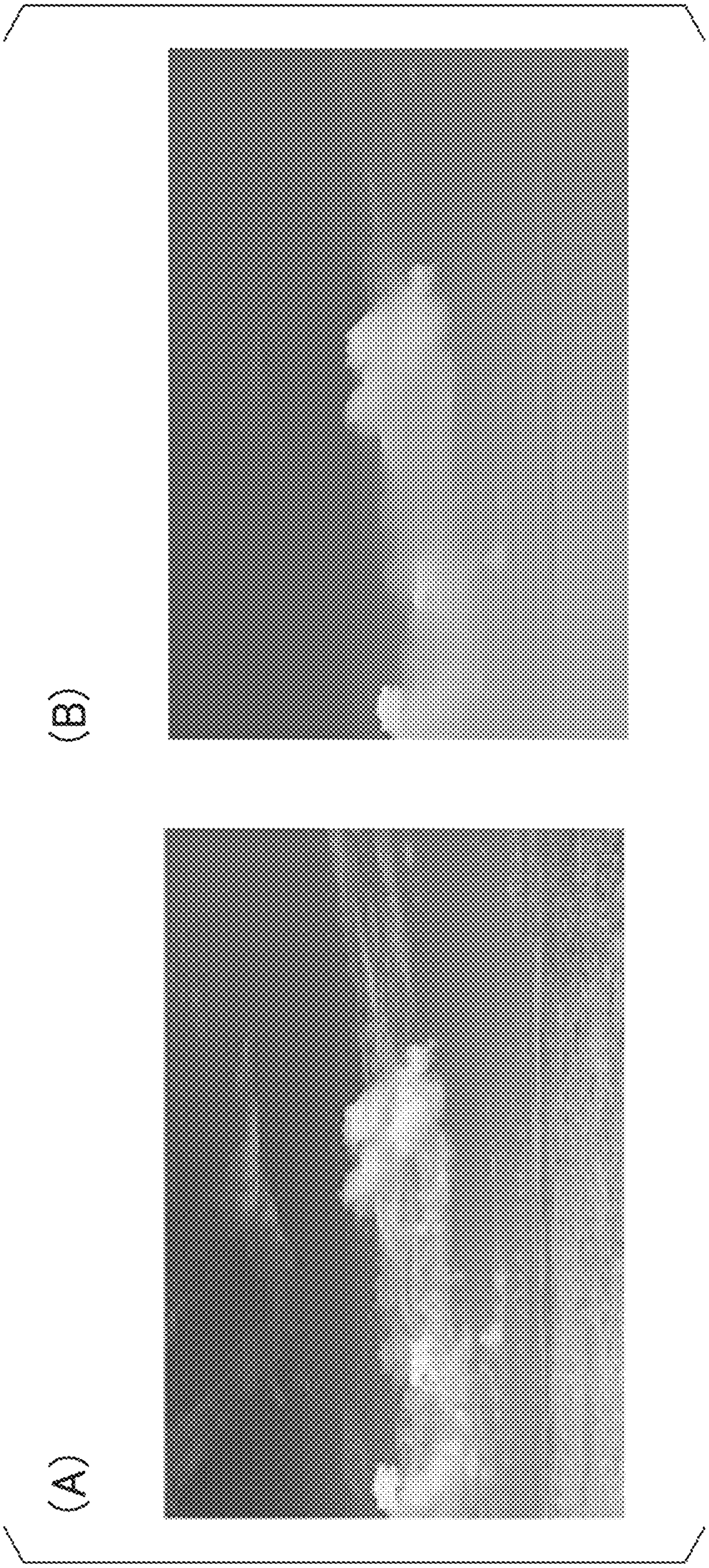
FIG. 3 is a diagram showing an example of images before and after local contrast adjustment.

FIG. 3 is a diagram showing an example of images before and after the local contrast adjustment. (A) of FIG. 3 represents an image before the local contrast adjustment is performed, and (B) of FIG. 3 represents an image after the local contrast adjustment is performed. In the local contrast adjustment, an edge to be maintained and an edge to be processed can be distinguished by threshold value setting.

In the image after the local contrast adjustment shown in (B) of FIG. 3, strong edge portions in the image are maintained by the threshold value setting, and weak edge portions where a change in luminance value is small are blurred by smoothing. Specifically, for example, a boundary portion between a deep-colored portion (a portion with low brightness) of the sky in the background and a cloud in the image has a large change in luminance value, and is recognized as a strong edge portion. Therefore, in the boundary portion, a state of the image (for example, a luminance value) is maintained as it is before and after the contrast adjustment.

On the other hand, regarding an area of a background portion (for example, a portion with few clouds in the sky area, and a portion of the sea surface), the change in luminance value is small, and the area is recognized as a weak edge portion. Therefore, in the image after the local contrast adjustment shown in (B) of FIG. 3, the image is locally blurred in the area of the background portion. In this way, by performing the local contrast adjustment, the orienting processing device 1 in the embodiment can classify the image into a blurred portion and a non-blurred portion, and can further increase a contrast of a pattern of interest.

Next, the filtering will be described. By performing the filtering, the orienting processing device 1 in the embodiment can remove noise included in the image and can sharpen and detect the pattern in the image.

The orienting processing device 1 can perform the filtering by performing a convolution operation, for example. The orienting processing device 1 multiplies all pixel values of a pixel of interest and neighboring pixels thereof in the input image by a corresponding pixel coefficient in a spatial filter. Then, the orienting processing device 1 replaces a value of a pixel at a location same as that of the pixel of interest in the output image by a total value of multiplication results for each pixel.

The filter can be broadly classified into a linear filter and a nonlinear filter. In the filtering using a linear filter, a linear calculation is performed between pixel values of an input image and pixel values of a filtered output image. On the other hand, in the filtering using a nonlinear filter, a non-linear calculation is performed between pixel values of an input image and pixel values of an output image.

The filter used for filtering can be broadly classified into three types, i.e., a smoothing filter, a sharpening filter, and an edge detection filter, depending on the effect obtained by processing.

The smoothing filter is used to remove noise included in the input image. A representative filter includes a moving average filter, a Gaussian filter, and a median filter.

The moving average filter performs smoothing by replacing a value of a pixel of interest with an average value of neighboring pixel values. While noise can be removed by the moving average filter, edges of the input image are also lost at the same time, resulting in image blurring. On the other hand, there is a weighted filter that changes coefficients of the filter depending on a distance from a center pixel.

Among the weighted filter, a filter whose coefficients are set based on Gaussian distribution is called a Gaussian filter. The median filter is a most basic nonlinear filter, and performs smoothing while preserving edge information by replacing a value of an output pixel with a median value between a value of a pixel of interest and values of neighboring pixels in an input image.

The sharpening filter is used for the purpose of emphasizing an edge in an image. As representative sharpening filter processing, there is processing of subtracting an input image from an output result of a Laplacian filter that calculates a spatial quadratic differential of a pixel value.

The edge detection filter is obtained by combining a smoothing filter and a differential filter. In the differential filter, a filter coefficient is determined by taking a difference between adjacent pixel values as a primary differential and further approximating a further obtained difference as a quadratic differential. A representative filter for edge detection includes a Prewitt filter, a Sobel filter, and a Laplacian filter.

The Prewitt filter and the Sobel filter are filters that utilize a difference in average value with neighboring pixels, and are based on a principle of primary differential. The Prewitt filter and the Sobel filter can specify a direction of edge detection, such as only in a vertical direction or only in a lateral direction, by using filter coefficients. On the other hand, as a differential filter based on the quadratic differential, there is a Laplacian filter.

Figure 4:
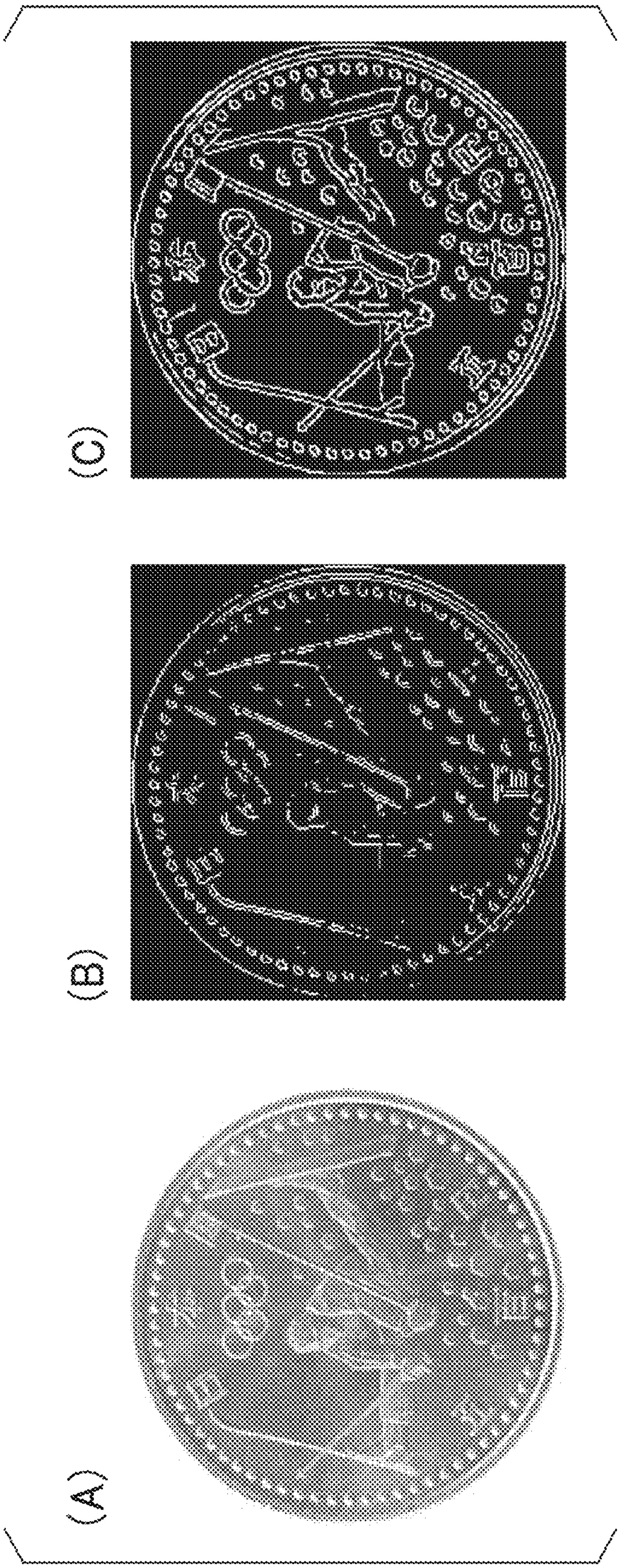
FIG. 4 is a diagram showing an example of images before and after filtering by a Canny filter and a Sobel filter.

In recent years, Canny filters have been used, which are less susceptible to edge detection failures and false detections and less susceptible to noise. FIG. 4 is a diagram showing an example of images before and after filtering by a Canny filter and a Sobel filter. (A) of FIG. 4 represents an image before the filtering, (B) of FIG. 4 represents an image after the filtering by the Sobel filter, and (C) of FIG. 4 represents an image after the filtering by the Canny filter.

As shown in FIG. 4, it can be seen that information on an outline and an edge of a coin drawn in the image before the filtering is more accurately detected in a case where the filtering is performed by the Canny filter than in a case where the filtering is performed by the Sobel filter.

[Image Registration]

Hereinafter, the image registration performed by the orienting processing device 1 in the embodiment will be described in detail.

The orienting processing device 1 in the embodiment performs a pattern alignment by image registration using an image in which a pattern is detected by the above-described image preprocessing and edges are emphasized. The image registration is a type of image analysis technique, and is a technique that estimates a geometric transformation necessary to align a common pattern between two images and performs the alignment of the patterns. In the image registration, one image is used as a reference image (a fixed image), and the geometric transformation is applied to another image (a moving image) to superimpose the other image on the reference image.

For example, the technique of image registration is used not only for an alignment between a satellite image and an aerial photograph, but also for an alignment between medical images imaged by a medical examination device such as magnetic resonance imaging (MRI) and single photon emission computed tomography (SPECT).

The image alignment technique using the image registration can be roughly divided into two types, i.e., a method based on feature points and a method based on an intensity of an image luminance value.

In the image registration method based on feature points, feature points are detected in a plurality of images at sharp corners, blobs, areas with uniform intensity, and the like. The image registration is performed by associating feature points common to each image. Examples of a function for detecting feature points include functions based on feature data, such as scale invariant feature transform (SIFT) and speed up robust features (SURF).

While the image registration method based on feature points can obtain a local correspondence relationship between images, there is a possibility that an unintended image registration result may be obtained due to incorrect association of feature points. In automatic feature point detection, the possibility is higher. On the other hand, in manual detection of feature points, it is necessary to subjectively detect at least three points from each image per image registration. Therefore, the manual detection of feature points is a very time-consuming method.

The image registration method based on an intensity of a luminance value includes a method of obtaining a difference in luminance values in an image and a method of obtaining a correlation in luminance values in an image. In the methods, the reference image and the moving image are compared in units of pixels, and an area having a small difference or an area having a high correlation is searched for to perform the alignment.

In a method of comparing images using a difference in luminance values, a difference degree such as a sum of absolute differences (SAD) or a sum of squared differences (SSD) is used. In the SAD, an absolute value of the difference in luminance values is used, and in the SSD, a value of a square of the difference in luminance values is used.

In a method of comparing images using a correlation between luminance values, a similarity such as a normalized cross-correlation (NCC) and a phase-only correlation (POC) is used. In particular, the image registration method using a POC is superior to the image registration method based on an intensity of a luminance value in terms of fastness against a luminance change and noise of the image. The orienting processing device 1 in the embodiment performs the image registration by a phase-only correlation method using a POC.

The image registration using the phase-only correlation method will be described below. As described above, the image registration using the phase-only correlation method is an image analysis technique used in a fingerprint matching system, a face authentication system, and the like in which detection of feature data is considered to be difficult in recent years.

Figure 5:
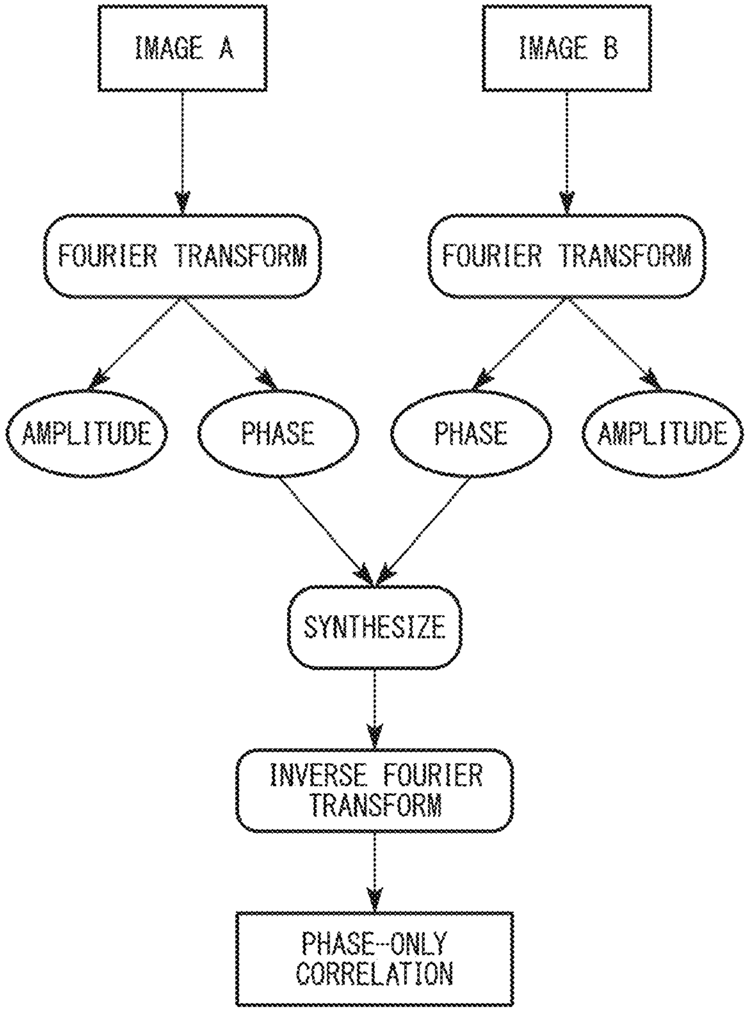
FIG. 5 is a diagram showing a procedure of a phase-only correlation method.

FIG. 5 is a diagram showing a procedure of the phase-only correlation method. In the phase-only correlation method, two images are transformed into a two-dimensional frequency domain by performing discrete Fourier transform, and then processing is performed. Hereinafter, a flow of processing using the phase-only correlation method will be described.

As an input image, two images f(m, n) and g(m, n) each including M×N pixels are considered. Assuming that g(m, n) is an image obtained by moving f(m, n) in an m direction and an n direction by $\delta_1$ and $\delta_2$, respectively, a relationship as in the following formula (1) is established.

[Formula 1]

$$g(m, n) = f(m - \delta_1, n - \delta_2) \tag{1}$$

When F(u, v) and G(u, v) are obtained by performing two-dimensional discrete Fourier transform on the images, they are represented by the following formulae (2) and (3), respectively.

[Formula 2]

$$F(u, v) = A_F(u, v)e^{j\theta_F(u,v)} \tag{2}$$

[Formula 3]

$$G(u, v) = A_G(u, v)e^{j\theta_G(u,v)} \tag{3}$$

$A_F(k_1, k_2)$ and $A_G(k_1, k_2)$ in the above formulae represent amplitude components of f(m, n) and g(m, n), respectively. In addition, $e\hat{}j\theta_F(k_1, k_2)$ and $e\hat{}j\theta_G(k_1, k_2)$ represent phase components. It is known that, among them, the phase component includes information on an image shape in the image. Therefore, in order to obtain the correlation using only the phase components of each image, a calculation expressed by the following formula (4) is performed.

[Formula 4]

$$H(k_1,k_2) = \frac{F(k_1, k_2)\overline{G(k_1, k_2)}}{\left|F(k_1, k_2)\overline{G(k_1, k_2)}\right|} = e^{j\theta_F(k_1,k_2)-\theta_G(k_1,k_2)} \tag{4}$$

Here, it is assumed that $G(k_1, k_2)$ with an upper line drawn and $G(k_1, k_2)$ without an upper line drawn have a conjugate relationship. When $H(k_1, k_2)$ obtained by the formula (4) is subjected to inverse discrete Fourier transform, a function called a phase-only correlation function (a POC function) can be obtained. In the image registration using the phase-only correlation method, a pattern alignment is performed based on information obtained from the POC function as described above.

[Orienting of Rock Core by Image Analysis]

Hereinafter, the image preprocessing and the orienting processing of a rock core using an image analysis technique such as image registration by the orienting processing device 1 in the embodiment will be described with reference to an example.

The orienting processing device 1 in the embodiment performs the orienting of the rock core by detecting a characteristic linear pattern corresponding to a vein from an image and performing image registration using the phase-only correlation method. Procedures 1 to 3, which are a general flow of the orienting of the rock core by the orienting processing device 1, are shown below.

Procedure 1 (Extraction and Forming of Image Data) Data of an original borehole image and core development image is formed into a format that facilitates image analysis.

Procedure 2. (Image Preprocessing) Only noticeable vein patterns drawn in image data are detected.

Procedure 3. (Image Registration) The image registration is performed using the phase-only correlation method using images in which only noticeable vein patterns are detected, and an orientation of the rock core is determined.

Hereinafter, an example of the flow of the orienting of the rock core by the orienting processing device 1 will be described in detail.

First, well logging is performed on a well. In the well logging, an optical camera is lowered into a drilled well, and images of a wall surface (a borehole) are taken while rotating the optical camera inside the well. Accordingly, a 360-degree development image of the borehole (a borehole image) is obtained. A surface of the rock core is imaged by a scanner. Accordingly, a 360-degree development image of the rock core (a core development image) is obtained.

In the present example, the well is inclined at about 45 degrees from a vertical direction and has an average diameter of about 96.3 [mm]. An average diameter of the rock core is about 47.6 [mm]. Hereinafter, a line representing an orientation corresponding to a vertically downward direction of a collected rock core is referred to as a "bottom line". For example, in the 360-degree core development image, the bottom line of the rock core determined visually is drawn at a depth of about 40% of a depth of approximately 800 [m]. Here, assuming that the bottom line was an orientation of the rock core, only data from a depth range of 500 [m] to 530 [m], where many bottom lines are drawn, out of image data for approximately 800 [m] was used.

Figure 6:
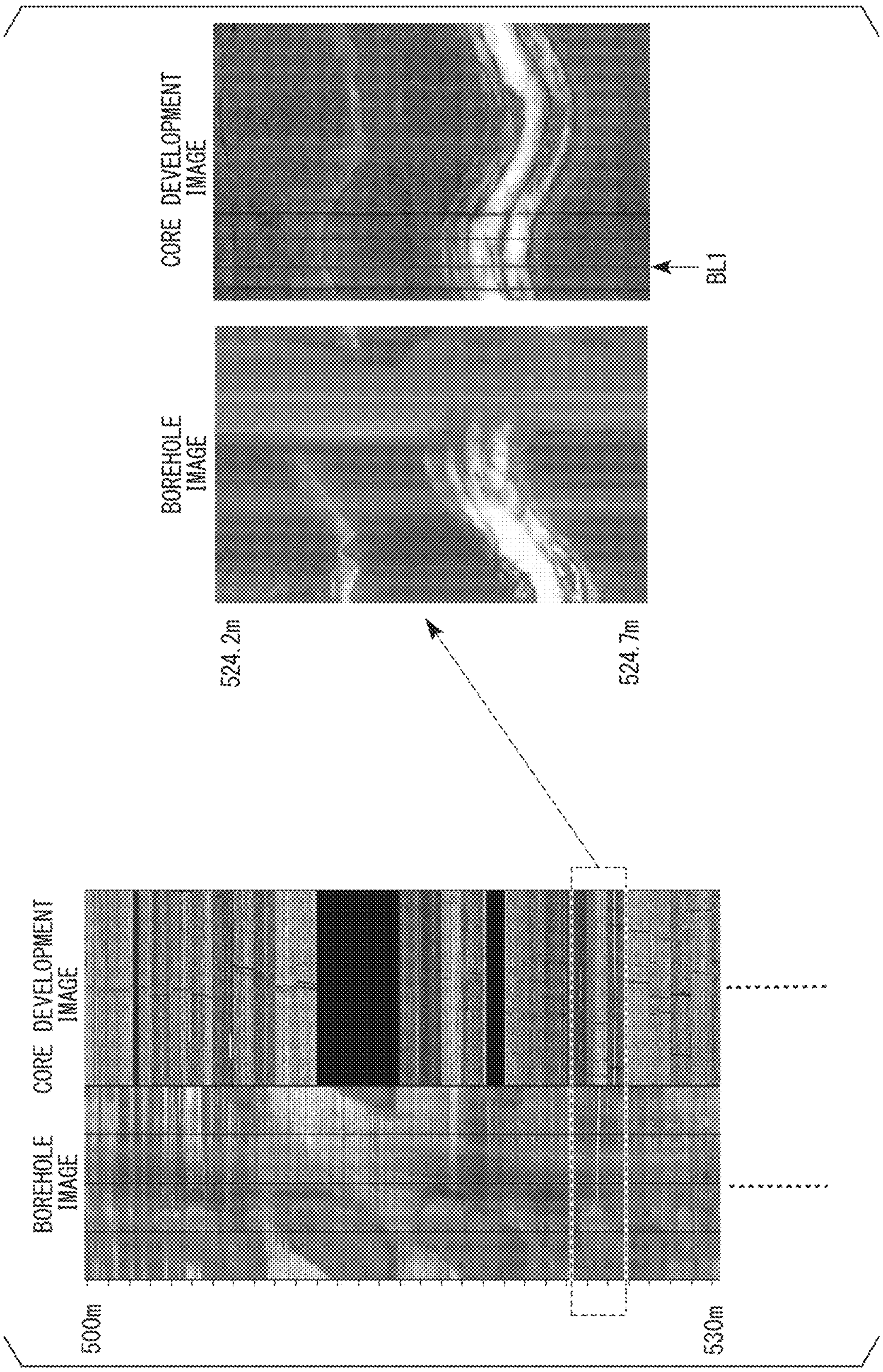
FIG. 6 is a diagram showing a borehole image and a core development image in an example.

FIG. 6 is a diagram showing a borehole image and a core development image used in the present example. In FIG. 6, a left half represents an image of an entire depth range of 500 [m] to 530 [m], and a right half represents an enlarged image around a depth of 524.5 [m]. Regarding the image on the left half of FIG. 6, the borehole image has an image size of 30801 pixels×1440 pixels (vertical×horizontal), and the core development image has an image size of 62730 pixels×275 pixels (vertical×horizontal).

In the borehole image, a line at an image center corresponds to an exact bottom line of the rock core. The right half of the vein pattern is hidden and invisible at most depths. This is caused by, for example, a fact that the optical camera collides with the borehole when imaging the borehole, the drilling pipe collides with the wall surface of the well, and the wall surface is scraped. On the other hand, a line BL1 corresponding to the above-described bottom line determined visually is drawn on the core development image.

Hereinafter, a description will be made according to the above procedures 1 to 3. First, the orienting processing device 1 of the embodiment performs processing of the following procedures 1-1 to 1-4 in the extraction and forming of image data in the procedure 1.

Figure 7:
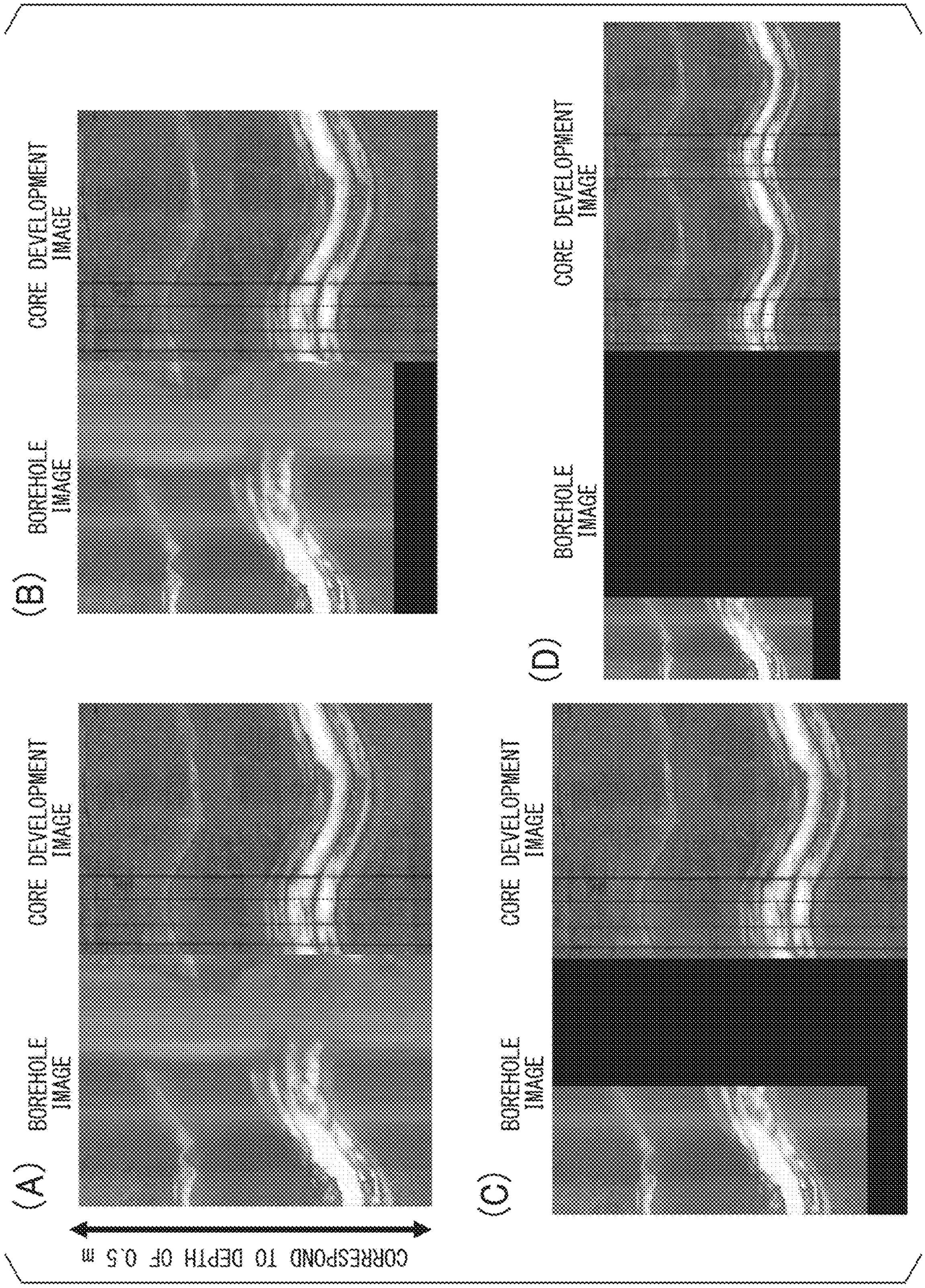
FIG. 7 is a diagram showing an example of the borehole image and the core development image.

FIG. 7 is a diagram showing an example of a borehole image and a core development image in the processing of the following procedures 1-1 to 1-4. The image used here is above-described data around the depth of 524.5 [m]. In (A), (B), (C), and (D) of FIG. 7, an image on a left side is the borehole image, and an image on a right side is the core development image.

Procedure 1-1. (Extraction of Borehole Image and Core Development Image Corresponding to Same Depth)

The orienting processing device 1 cuts out a borehole image and a core development image corresponding to the same depth from image data from the depth range of 500 [m] to 530 [m], and matches two image sizes. For example, the orienting processing device 1 cuts out an image such that an image size is 280 pixels vertically and 180 pixels horizontally, and a length in a vertical direction is equivalent to an actual depth of 0.5 [m] ((A) of FIG. 7).

Procedure 1-2. (Reduction of Borehole Image in Vertical Direction)

The orienting processing device 1 reduces only a vertical width of the borehole image. As described above, since average diameters of the well and the rock core are different from each other, in the case of the same image size, a vein pattern drawn in the borehole image has an amplitude larger than that of a vein pattern in the core development image. Therefore, the orienting processing device 1 roughly matches the amplitudes of the vein patterns drawn in the borehole image and the core development image by reducing the size of the borehole image in the vertical direction ((B) of FIG. 7).

Procedure 1-3. (Trimming of Right Side Portion of Borehole Image)

The orienting processing device 1 removes the right half of the borehole image by trimming ((C) of FIG. 7). Accordingly, when performing the image registration, the orienting processing device 1 can avoid a portion where the vein pattern is invisible from affecting the image registration result.

Procedure 1-4. (Parallelization of Core Development Images in Lateral Direction)

The orienting processing device 1 arranges two identical core development images horizontally and expands the 360-degree core development image into a 720-degree core development image ((D) of FIG. 7). Accordingly, the orienting processing device 1 can prevent occurrence of a location where the vein pattern in the core development image is interrupted in the middle, and can further stabilize the image registration result.

The orienting processing device 1 in the embodiment performs the image preprocessing in the procedure 2 on the borehole image and the core development image on which the processing according to the procedures 1-1 to 1-4 described above are performed. A flow of the image preprocessing will be described below. The orienting processing device 1 performs processing of the following procedures 2-1 and 2-2 in the image preprocessing in the procedure 2.

Procedure 2-1. (Grayscale Conversion of Borehole Image and Core Development Image)

The orienting processing device 1 converts the borehole image and the core development image from color images to grayscale images. By the conversion, the orienting processing device 1 converts the image from three-dimensional array data to two-dimensional array data, and facilitates image analysis.

Procedure 2-2. (Image Contrast Adjustment)

The orienting processing device 1 performs the above-described local contrast adjustment in order to emphasize contrasts of large and thick vein patterns drawn in the borehole image and the core development image.

Procedure 2-3. (Image Filtering)

The orienting processing device 1 performs filtering using the above-described Canny filter, Sobel filter, and the like on the borehole image and the core development image whose contrast is adjusted. As described above, the Canny filter can detect edges more accurately than the Sobel filter, but cannot specify an edge detection direction. On the other hand, the Sobel filter is inferior to the Canny filter in edge detection accuracy, but can specify an edge detection direction.

Here, it is ideal not to detect an edge in the vertical direction since a shape of a vein pattern desired to be detected is basically regarded as a shape similar to a sine wave in the lateral direction. Therefore, the orienting processing device 1 in the embodiment detects the edge of the vein pattern by the Canny filter regardless of the direction, and then detects only the edge in the lateral direction by the Sobel filter. Through the series of preprocessing, the orienting processing device 1 can remove small noise and a thin vein pattern in the image, and can detect only a large and thick vein pattern in a lateral direction as an edge.

The orienting processing device 1 in the embodiment performs the image registration processing using the phase-only correlation method on the borehole image and the core development image on which the image preprocessing according to the above-described procedures 2-1 to 2-3 is performed. The flow of the image registration processing using the phase-only correlation method will be described below. The orienting processing device 1 performs the following processing of procedures 3-1 and 3-2 in the image registration processing in the procedure 3.

Procedure 3-1. (Image Registration Using Phase-only Correlation Method)

The orienting processing device 1 performs the image registration using the preprocessed borehole image and core development image, and performs the alignment of the patterns. The orienting processing device 1 moves the images such that the pattern of the borehole image overlaps the pattern of the core development image.

Procedure 3-2. (Detection of Deviation of Orientation of Rock Core)

Here, a deviation between the orientation of the rock core determined by the image registration and the orientation of the rock core determined by the above-described visual pattern alignment was detected, and an effectiveness of the image analysis by the orienting processing device 1 of the embodiment was verified.

Figure 8:
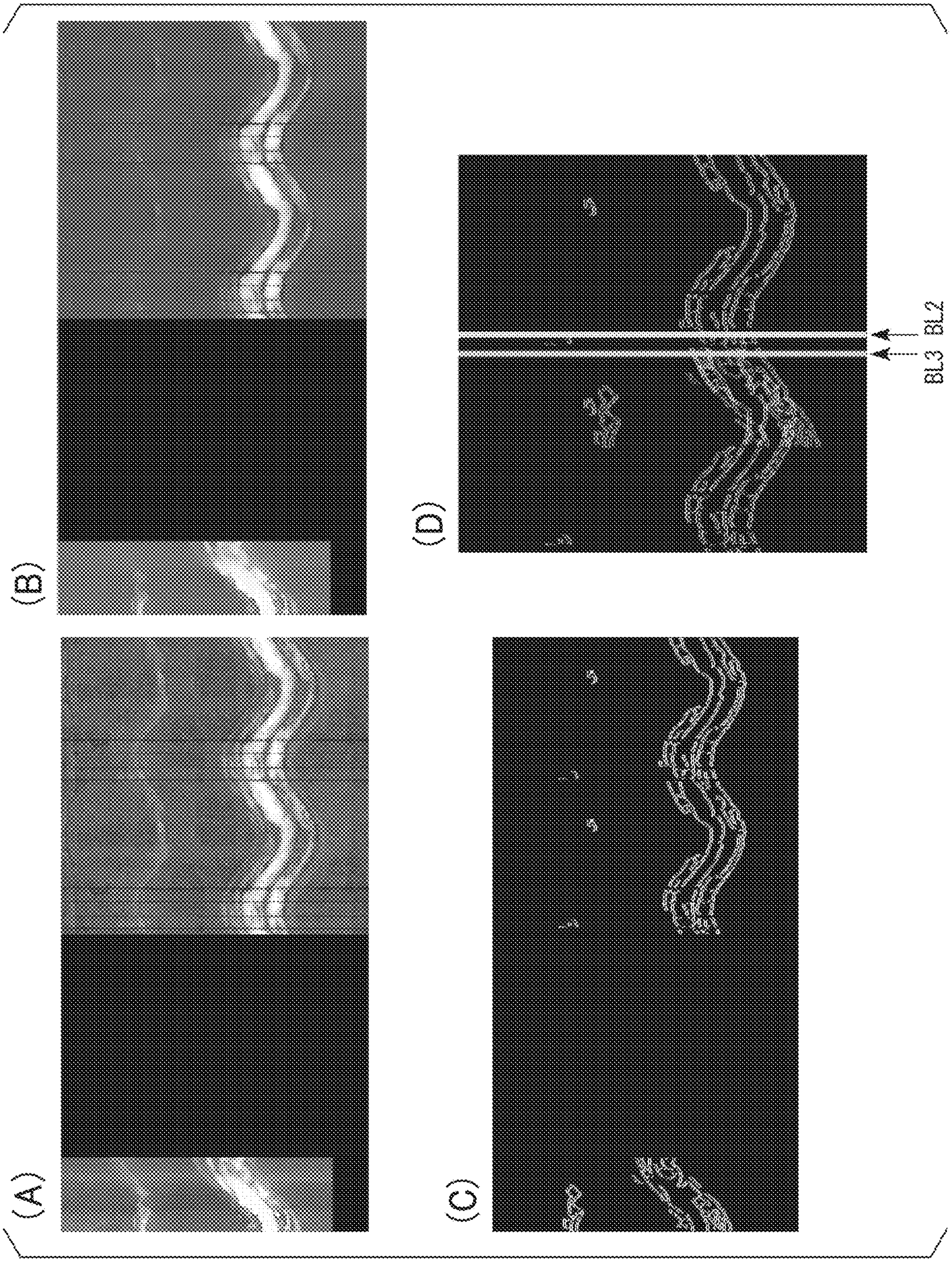
FIG. 8 is a diagram showing an example of an image analysis result by image preprocessing and image registration.

FIG. 8 is a diagram showing an example of an image analysis result by the above-described image preprocessing of the procedures 2-1 to 2-3 and image registration processing of the procedures 3-1 and 3-2. The image used here is the data around the depth of 524.5 [m] as in FIG. 7. Images in (A), (B), and (C) of FIG. 8 represent an image after grayscale conversion, an image after local contrast adjustment, and an image after edge detection, respectively.

(D) of FIG. 8 is an image showing a result of performing the image registration using the borehole image and the core development image after the edge detection. In (D) of FIG. 8, a line BL2 represents the bottom line of the rock core determined by the visual pattern alignment, and a line BL3 represents the bottom line of the rock core determined by the image registration.

Here, a deviation between the line BL2 and the line BL3 was obtained using the bottom line of the rock core determined by the visual pattern alignment as a reference. At this time, when the line BL3 is on a left side of the line BL2, the deviation has a negative value, and when the line BL3 is on a right side of the line BL2, the deviation has a positive value.

A numerical value indicating a magnitude of the deviation indicates how much the orientation of the rock core determined by the image analysis deviates from the exact orientation. For example, in crustal stress measurement, since an error in determining a stress direction of 10 degrees is recognized, the orienting processing device 1 may perform the orienting such that the above deviation is within a range of about 20 degrees.

Hereinafter, examples of analysis and verification results of the orienting of the rock core by the orienting processing device 1 in the embodiment will be described.

Here, as an example, an analysis result and a verification result in a case where the orienting processing device 1 performs the orienting of the rock core according to the above-described procedures 1 to 3 using the borehole image and the core development image in the depth range of 500 [m] to 530 [m] will be described.

Here, the orienting processing device 1 performed the orienting of the rock core using image data around a depth of 524.4 [m] to 524.7 [m] where large and thick vein patterns are present. At this time, an operation of manually adjusting parameters that can be set during the image preprocessing, and searching for a parameter set that minimizes the deviation in orientation was performed. FIG. 9 is a diagram showing parameters that can be set during the preprocessing and optimized parameter values.

A parameter that can be set during the local contrast adjustment includes a threshold value for edges in an image to be maintained as it is, and a smoothing degree for edges below a threshold value. A parameter that can be set during the filtering includes a threshold value for edges detected during the Canny filter and the Sobel filter. The threshold value for edges to be maintained during the local contrast adjustment takes a value of 0 to 1, and the closer it is to 1, the fewer edges are maintained.

Here, a parameter value set as a specified value was used. The smoothing degree takes a value of −1 to 0, and the closer it is to −1, the stronger the smoothing degree. Here, an optimal parameter value was set by reducing the value by 0.1 from −1 to −0.1 and reducing the value by 0.01 from −0.1 to 0, while checking a change in the image.

On the other hand, a threshold value for detection edges in the Canny filter and the Sobel filter takes a value of 0 to 1, and the closer it is to 1, the fewer edges are detected. Here, the optimum parameter value was set by reducing the value by 0.1 from 0.5. Hereinafter, a method for optimizing the parameter will be described.

Figure 10:
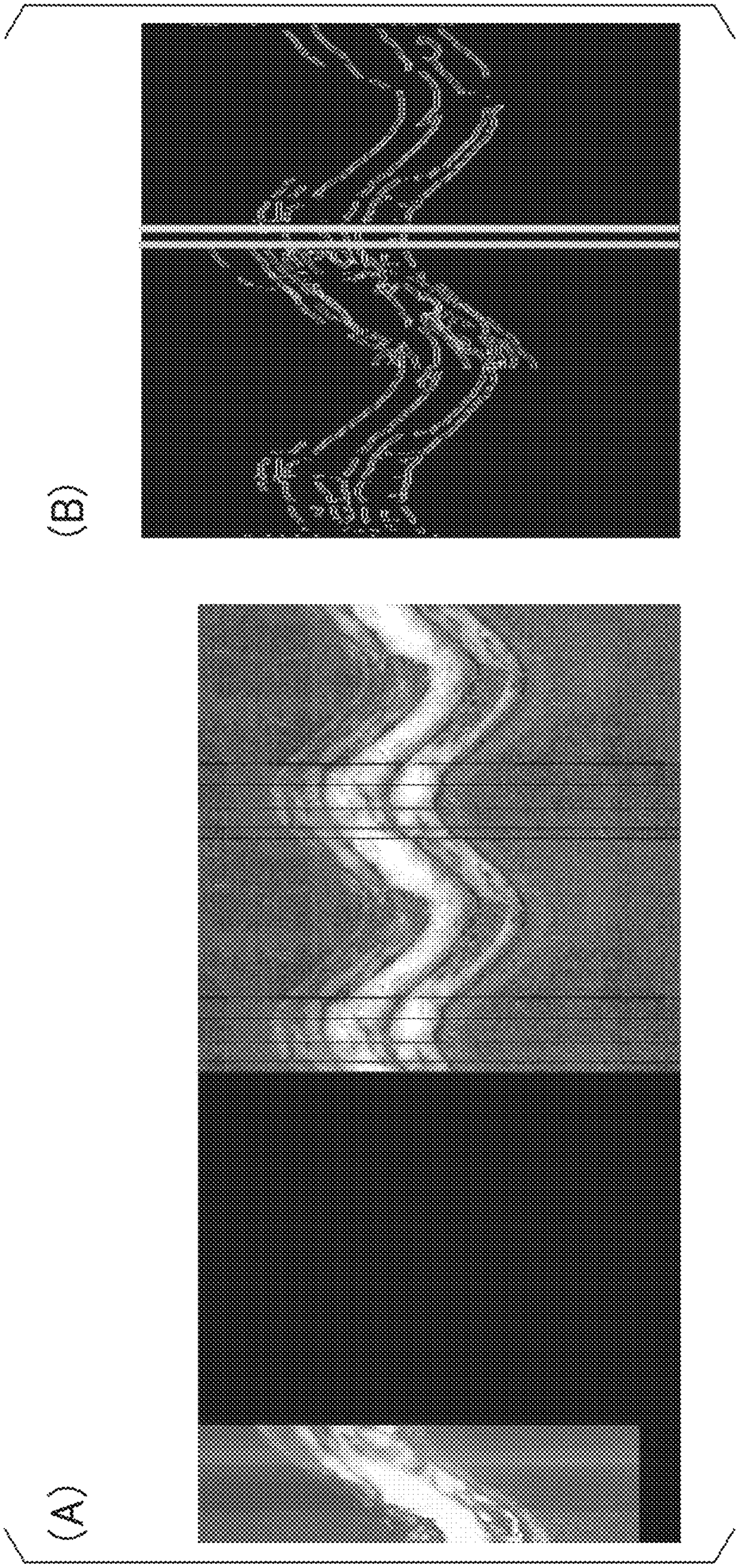
FIG. 10 is a diagram showing the borehole image and the core development image used in the example, and an image registration result.
Figure 11:
FIG. 11 is a diagram showing an example of an extracted rock core.
Figure 12:
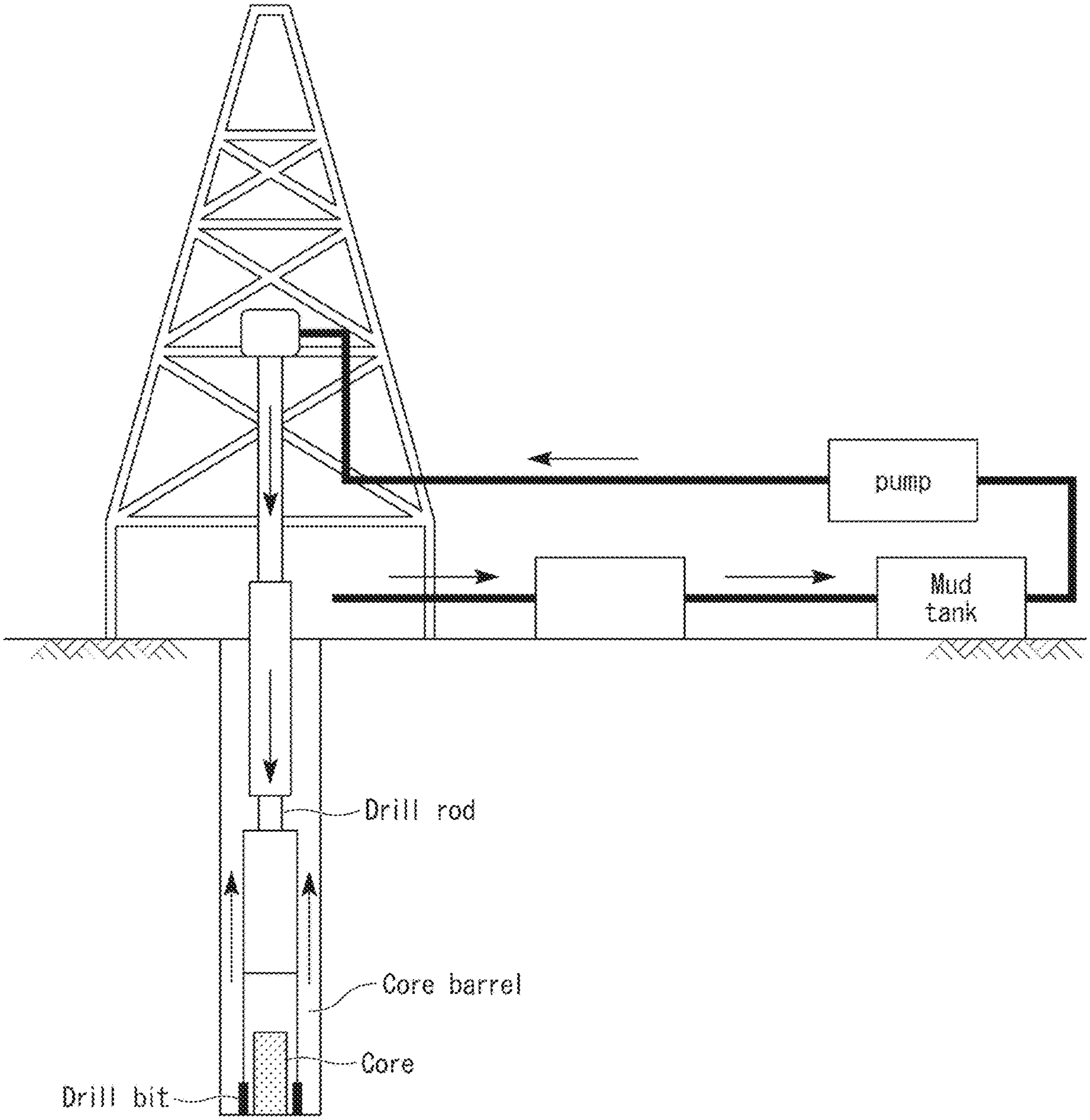
FIG. 12 is a schematic diagram showing an example of coring.
Figure 13:
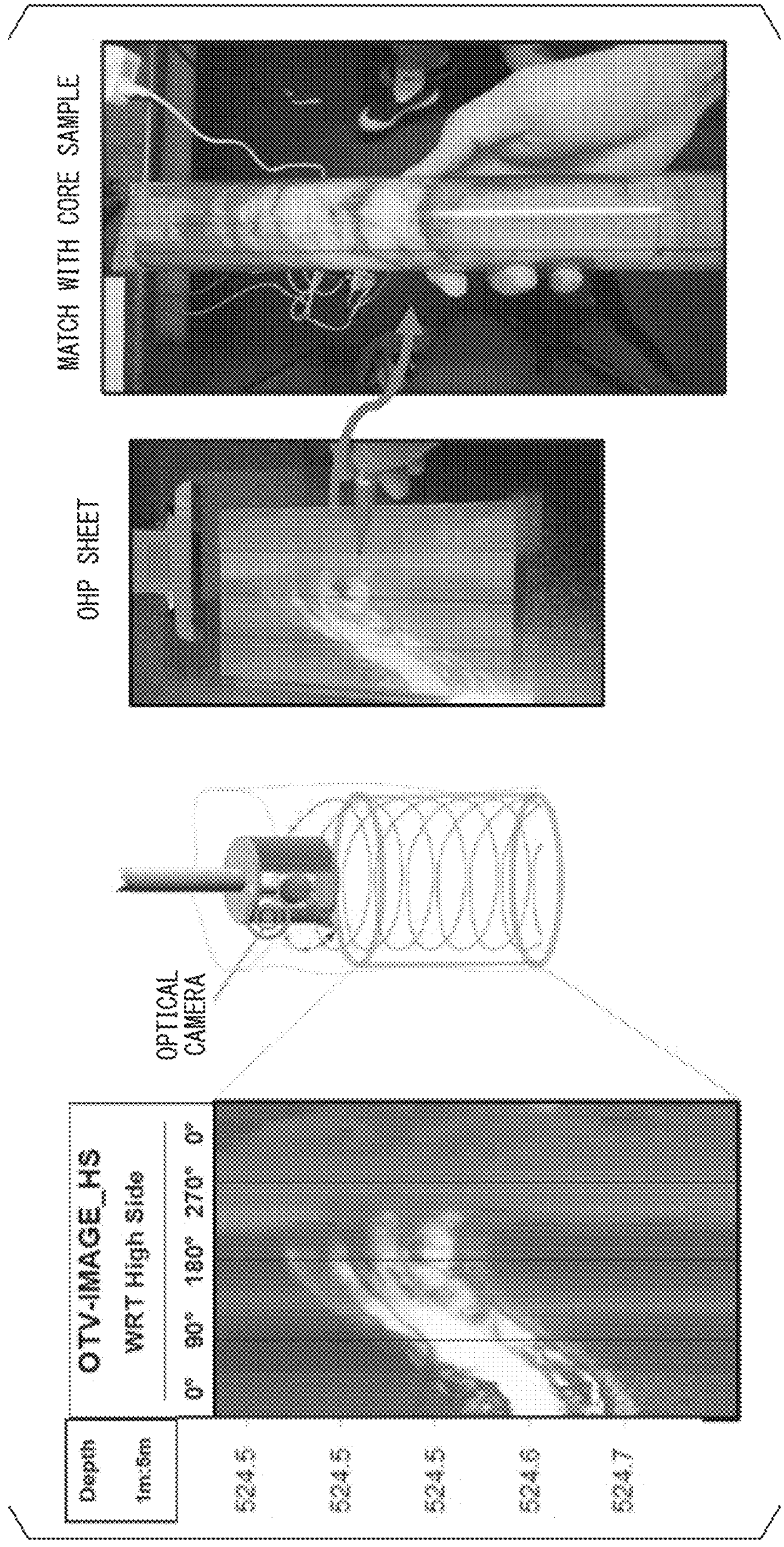
FIG. 13 is a diagram showing a state of orienting of the rock core.

FIG. 10 is a diagram showing the used borehole image and core development image, and an image registration result. (A) of FIG. 10 represents the used borehole image and core development image, and (B) of FIG. 10 represents the image registration result. In the present example, a deviation of the orientation obtained based on the image registration result was 12.2 degrees. That is, the deviation of the orientation obtained here was within 20 degrees, which was within an allowable range of error in determining the stress direction in the above-described crustal stress measurement.

It can be seen that, even when visually checking the image registration result shown in (B) of FIG. 10, the pattern of the borehole image and the pattern of the core development image are not largely deviated. As described above, it is considered that, by appropriately adjusting the parameters of the preprocessing, the orienting processing device 1 in the embodiment can perform the orienting of the rock core by the image analysis with high accuracy.

As described above, the orienting processing device 1 of the embodiment performs the orienting of the rock core by performing the alignment between the pattern of the core development image and the pattern of the borehole image of which the orientation is known by the image registration, which is one of image analysis methods. With the above-described configuration, the orienting processing device 1 of the embodiment can objectively and automatically identify the orientation of the rock core.

The orienting processing device 1 may perform the orienting of the rock core using machine learning. Specifically, it is conceivable to construct a learning model that outputs an image-registered image in response to the input of the borehole image and the core development image. By using the machine learning, all image analysis processing related to the orienting of the rock core, including adjustment of the parameters in the image preprocessing, can be automated. Accordingly, the orienting of the rock core can be more easily performed.

Hereinafter, an example of a procedure of performing the orienting of the rock core using the machine learning will be described. First, the orienting processing device 1 automatically divides, for example, a borehole image for several hundred [m] into every 0.5 [m] (Step 1). Next, the orienting processing device 1 combines the divided borehole images and the core development image for each depth (Step 2). Next, the orienting processing device 1 creates a supervised data set by combining the core development image, the borehole image, and the image registration result for each depth (Step 3). Next, the orienting processing device 1 performs the machine learning using the generated supervised data set to obtain a trained learning model (Step 4). Next, the orienting processing device 1 adjusts parameters of the trained learning model using test data or the like to further improve the accuracy of the orienting (Step 5). Step 5 may be omitted. Next, the orienting processing device 1 inputs a borehole image and a core development image, which are targets of orienting, to the trained learning model, and obtains, an image-registered image output from the learning model. The orienting processing device 1 performs the orienting of the rock core using the obtained image (Step 6). The orienting processing device 1 may further perform machine learning using the input and output data in Step 6 as supervised data.

According to the embodiment described above, an orienting processing device includes an image data acquisition unit, a feature data extraction unit, and an orienting unit. For example, the orienting processing device is the orienting processing device 1 in the embodiment, the image data acquisition unit is the image data acquisition unit 10 in the embodiment, the feature data extraction unit is the feature data extraction unit 20 in the embodiment, and the orienting unit is the orienting unit 30 in the embodiment.

The image data acquisition unit acquires rock image data indicating a rock image obtained by imaging a surface of a drilled rock, borehole image data indicating a borehole image obtained by imaging a surface of a borehole at a location where the rock was present, and orientation information indicating an orientation in which the surface of the borehole is imaged. For example, the rock image is the core development image in the embodiment. The feature data extraction unit extracts feature data related to a pattern of the surface of the rock from the rock image, and extracts feature data related to a pattern of the borehole image. For example, the pattern is a vein pattern in the embodiment, and the feature data is a pixel value (such as an edge) in the embodiment. The orienting unit performs an alignment between the pattern of the surface of the rock and the pattern of the surface of the borehole based on the feature data extracted by the feature data extraction unit, and identifies, based on a result of the alignment and the orientation information, an orientation in which the surface of the rock is imaged. For example, the alignment is image registration in the embodiment.

The orienting unit may perform the alignment between the pattern of the surface of the rock and the pattern of the surface of the borehole using a phase-only correlation method.

The orienting unit may perform the alignment by approximating the patterns to a shape of a sine wave.

The feature data extraction unit may extract the feature data while emphasizing an edge of the pattern of the surface of the rock and an edge of the pattern of the surface of the borehole by performing contrast adjustment on the rock image and the borehole image.

The feature data extraction unit may extract the feature data while emphasizing an edge of the pattern of the surface of the rock and an edge of the pattern of the surface of the borehole by performing filtering on the rock image and the borehole image.

The feature data extraction unit may perform the filtering using a Canny filter.

A part or all of the orienting processing device 1 in each of the above-described embodiments may be implemented by a computer. In this case, the orienting processing device 1 may be implemented by recording a program for implementing the function on a computer-readable recording medium, and reading and executing the program recorded on the recording medium by a computer system. The "computer system" here includes an OS and hardware such as a peripheral device. In addition, the "computer-readable recording medium" refers to a storage device such as a portable medium such as a flexible disk, a magneto-optical disk, an ROM, and a CD-ROM, or a hard disk built in the computer system. Further, the "computer-readable recording medium" may also include one that dynamically stores a program for a short period of time, such as a communication line when transmitting a program via a network such as the Internet or a communication line such as a telephone line, and one that stores a program for a certain period of time, such as a volatile memory in a computer system serving as a server or a client in that case. The program may be a program for implementing a part of the above-described functions, may be a program capable of implementing the above-described functions in combination with a program already recorded in a computer system, or may be a program implemented using a programmable logic device such as a field programmable gate array (FPGA).

As described above, the embodiment of the invention has been described in detail with reference to the drawings, specific configurations are not limited to the embodiment, and designs and the like within a range not departing from the gist of the present invention are also included.

REFERENCE SIGNS LIST

1: Orienting processing device
10: Image data acquisition unit
20: Feature data extraction unit
21: Image forming unit
22: Grayscale conversion unit
23: Contrast adjustment unit
24: Filtering unit
30: Orienting unit
31: Registration unit
32: Orientation identification unit
40: Result output unit

The invention claimed is:

1. An orienting processing device comprising:
at least one memory configured to store instructions; and
at least one processor configured to execute the instructions to:
acquire rock image data indicating a rock image obtained by imaging a surface of a rock which is drilled, borehole image data indicating a borehole image obtained by imaging a surface of a borehole at a location where the rock was present, and orientation information indicating an orientation in which the surface of the borehole is imaged;
extract feature data related to a pattern of the surface of the rock from the rock image, and extract feature data related to a pattern of the surface of the borehole image; and
perform an alignment between the pattern of the surface of the rock and the pattern of the surface of the borehole based on the extracted feature data, and identify an orientation in which the surface of the rock is imaged based on a result of the alignment and the orientation information,
wherein, in extracting, the feature data is extracted while emphasizing an edge of the pattern of the surface of the rock and an edge of the pattern of the surface of the borehole, by performing a series of processing on the rock image and the borehole image, the series of processing including a first filtering that detects the edge of the pattern by a first filter regardless of a direction, and a second filtering that detects the edge in a lateral direction by a second filter after the first filtering.

2. The orienting processing device according to claim 1, wherein
the at least one processor is configured to execute the instructions to perform the alignment between the pattern of the surface of the rock and the pattern of the surface of the borehole using a phase-only correlation method.

3. The orienting processing device according to claim 2, wherein
the at least one processor is configured to execute the instructions to perform a process to approximate the patterns of the surface of the rock and the pattern of the surface of the borehole to a shape of a sine wave based on the extracted feature data, and perform the alignment between the processed pattern of the surface of the rock and the processed pattern of the surface of the borehole.

4. The orienting processing device according to claim 1, wherein
the at least one processor is configured to execute the instructions to extract the feature data while emphasizing an edge of the pattern of the surface of the rock and an edge of the pattern of the surface of the borehole by performing contrast adjustment on the rock image and the borehole image.

5. The orienting processing device according to claim 1, wherein the at least one processor is configured to execute the instructions to perform, as the series of processing, the first filtering using a Canny filter, which detects the edge of the pattern regardless of the direction, followed by the second filtering using a Sobel filter, which detects the edge in the lateral direction.

6. The orienting processing device according to claim 1, wherein the at least one processor is configured to execute the instructions to expand the rock image data by arranging two rock images horizontally based on the acquired rock image data, and extracts the feature data based on the expanded rock image data.

7. The orienting processing device according to claim 6, wherein the at least one processor is configured to execute the instructions to extract the feature data related to the pattern of the surface of the borehole image, which is obtained by removing a portion where the pattern is invisible based on the acquired borehole image data.

8. The orienting processing device according to claim 1, wherein the at least one processor is configured to execute the instructions to:

reduce a size of the borehole image data in a vertical direction, among the rock image data and the borehole image data that are acquired;

expand the rock image data by arranging two rock images horizontally based on the acquired rock image data, and extract the feature data based on the expanded rock image data; and extract the feature data related to the pattern of the surface of the borehole image based on borehole image data obtained after a process, in which the size of the borehole image data is reduced in the vertical direction.

9. An orienting assistance method comprising:

acquiring, by a computer, rock image data indicating a rock image obtained by imaging a surface of a rock which is drilled, borehole image data indicating a borehole image obtained by imaging a surface of a borehole at a location where the rock was present, and orientation information indicating an orientation in which the surface of the borehole is imaged;

extracting, by a computer, feature data related to a pattern of the surface of the rock from the rock image, and extracting feature data related to a pattern of the surface of the borehole image; and performing, by a computer, an alignment between the pattern of the surface of the rock and the pattern of the surface of the borehole based on the feature data extracted in the extracting, and identifying an orientation in which the surface of the rock is imaged based on a result of the alignment and the orientation information, wherein the extracting includes extracting the feature data while emphasizing an edge of the pattern of the surface of the rock and an edge of the pattern of the surface of the borehole, by performing a series of processing on the rock image and the borehole image, the series of processing including a first filtering that detects the edge of the pattern by a first filter regardless of a direction, and a second filtering that detects the edge in a lateral direction by a second filter after the first filtering.

10. A non-transitory computer-readable storage medium that stores a program for causing a computer to execute processes, the processes comprising:

acquiring rock image data indicating a rock image obtained by imaging a surface of a rock which is drilled, borehole image data indicating a borehole image obtained by imaging a surface of a borehole at a location where the rock was present, and orientation information indicating an orientation in which the surface of the borehole is imaged;

extracting feature data related to a pattern of the surface of the rock from the rock image, and extracting feature data related to a pattern of the surface of the borehole image; and performing an alignment between the pattern of the surface of the rock and the pattern of the surface of the borehole based on the feature data extracted in the extracting, and identifying an orientation in which the surface of the rock is imaged based on a result of the alignment and the orientation information, wherein the extracting includes extracting the feature data while emphasizing an edge of the pattern of the surface of the rock and an edge of the pattern of the surface of the borehole, by performing a series of processing on the rock image and the borehole image, the series of processing including a first filtering that detects the edge of the pattern by a first filter regardless of a direction, and a second filtering that detects the edge in a lateral direction by a second filter after the first filtering.

* * * * *